United States Patent
Ohoka et al.

[11] Patent Number: 6,137,567
[45] Date of Patent: Oct. 24, 2000

[54] LASER SURVEY INSTRUMENT

[75] Inventors: Mitsutoshi Ohoka; Kazuki Osaragi; Jun-ichi Kodaira, all of Tokyo-to, Japan

[73] Assignee: Kabushiki Kaisha TOPCON, Tokyo-to, Japan

[21] Appl. No.: 09/159,808

[22] Filed: Sep. 23, 1998

[30] Foreign Application Priority Data

Sep. 30, 1997 [JP] Japan .................................. 9-282930

[51] Int. Cl.⁷ ...................................................... G01C 1/00
[52] U.S. Cl. ........................................................... 356/147
[58] Field of Search .................................... 356/140, 147, 356/152.1, 141.3, 141.1

[56] References Cited

U.S. PATENT DOCUMENTS 5,898,490  4/1999  Ohtomo et al. ...................... 356/141.3
5,946,087  8/1999  Kasori et al. ............................. 356/249

Primary Examiner—Frank G. Font
Assistant Examiner—Michael P. Stafira
Attorney, Agent, or Firm—Nields, Lemack & Dingman

[57] ABSTRACT

The laser survey instrument according to the present invention comprises a rotary laser device and a photodetector for receiving a laser beam, wherein the rotary laser device comprises a light source unit for emitting the laser beam, a rotator for projecting the laser beam toward the photodetector by rotary irradiation, detection means for detecting status of the rotary laser device, and a control unit for changing the number of rotations of said rotator based on the result of detection from the detection means in order to transmit the detection result from the detection means to the photodetector, the photodetector comprises a photodetection unit for receiving the laser beam from the rotary laser device and for issuing a photodetection signal, display means having a display corresponding to the photodetection signal, and judging means for detecting the number of rotations of the laser beams from the photodetection signal of the photodetection unit and for operating the display means according to the rotating condition, the rotary laser device changes the number of rotations of the laser beam according to trouble when trouble occurs on the rotary laser device, and the photodetector judges the number of rotations of the laser beam, provides a display corresponding to the number of rotations and notifies status of trouble on the rotary laser device.

11 Claims, 6 Drawing Sheets

LASER SURVEY INSTRUMENT

BACKGROUND OF THE INVENTION

The present invention relates to a laser survey instrument for forming a reference line or a reference plane by projecting a laser beam, and in particular to a laser survey instrument comprising a photodetector.

There are two types of laser survey instrument for forming a reference plane by rotary irradiation of a laser beam: a type using a visible light as a laser beam and the other type using an invisible light.

In the laser survey instrument using an invisible light as a laser beam, a photodetector is arranged at a position of an irradiation target, and an irradiation position of the laser beam is confirmed by the photodetector. Then, an index is marked at a position aligned with the irradiation position of the laser beam.

In the laser survey instrument using a visible light as a laser beam, a laser beam is directly projected to an irradiation plane, e.g. to an interior wall surface, and after visually confirming the irradiation position, an index is marked at a reference position. Also, on the laser survey instrument using a visible light as a laser beam, a photodetector is used in many cases.

Description is now given on a laser survey instrument referring to FIG. 7.

In this figure, reference numeral 1 represents a rotary laser device, and 2 represents a photodetector.

The rotary laser device 1 is installed using a tripod or other means (not shown). The rotary laser device 1 has a rotator 3, and a laser beam 4 is projected from the rotator 3 by rotary irradiation.

The photodetector 2 comprises a photodetection unit 5 for receiving the laser beam 4 and a display unit 6 for displaying a position of photodetection, and notches 7 are formed on each of lateral ends of the photodetector 2.

The photodetector 2 is supported on the irradiating position of the laser beam on a wall surface. When the laser beam 4 passes through it, the photodetection unit 5 detects the passing position. Based on the result of the detection by the photodetection unit 5, the display unit 6 displays that the irradiation position of the photodetector 2 with respect to the laser beam 4 is adequate. If it is not adequate, a direction deviated or a direction to be corrected is displayed by arrows 8. In case the position of the photodetector 2 is adequate, a mark is indicated using the notches 7. The mark thus indicated serves as an index of a reference position.

The marking operation as described above is based on the assumption that the rotary laser device 1 is properly leveled and that a reference plane formed by the laser beam 4 is horizontal. Therefore, if the rotary laser device 1 is tilted, the formed reference plane is also tilted, and the reference position is not aligned with the horizontal plane.

For this reason, in the conventional type laser survey instrument, the rotary laser device 1 is provided with display means 9, e.g. an alarm lamp to display status of the rotary laser device 1 such as tilting of the rotary laser device due to falling-down of the tripod caused by vibration. The display means 9 also displays information such as shortage of battery power.

In the conventional type laser survey instrument as described above, the photodetector 2 is normally used at a position considerably distant from the rotary laser device 1. As a result, even when there is trouble in the main unit and it is displayed by the alarm lamp on the display unit 9 of the main body, it is difficult to detect the alarm display from the position of the photodetector 2. Because the rotary laser device 1 is used for all-round rotation, there arises such a problem that the alarm display cannot be confirmed at all if direction of the display unit 9 of the main body is deviated due to the direction of the rotary laser device 1.

Further, in case a wireless equipment is incorporated and used instead of the display unit of the rotary laser device 1, there is limitation to radio frequency and power supply. That is, the used frequency varies according to each country, and there are problems in that much power is required for wireless equipment and a battery of large capacity is needed. There is an alternative way, i.e. to modulate the frequency and to transmit the information to the photodetector 2 via the laser beam. However, frequency modulation must be considerably high depending on the number of rotations and on the size of the photodetection unit of the photodetector 2, and it may be technically difficult or power consumption may increase.

SUMMARY OF THE INVENTION

It is an object of the present invention to provide a laser survey instrument, by which it is possible to transmit an information about abnormal condition of the rotary laser device to a remote point by simple method and without requiring much power consumption. It is another object of the present invention to provide a laser survey instrument, by which it is possible to identify status error of the rotary laser device at a remote point and to provide a display to match the status of the abnormality.

To attain the above objects, the laser survey instrument according to the present invention comprises a light source unit for emitting the laser beam, a rotator for projecting the laser beam toward a photodetector by rotary irradiation, detection means for detecting status of a main body, and a control unit for changing the number of rotations of the rotator based on the result of detection from the detection means in order to transmit the direction result from the detection means to the photodetector. Also, in the laser survey instrument of the present invention, the detection means detects tilting of the main body, and the control unit changes the number of rotations of the rotator when tilting of the rotary laser device exceeds a predetermined value. Also, in the laser survey instrument of the present invention, the detection means detects remaining capacity of the battery, and the control unit changes the number of rotations of the rotator when the remaining capacity of the battery is below a predetermined value. Further, in the laser survey instrument of the present invention, the detection means detects plural kinds of status errors of the main body such as tilting of the main body, the remaining capacity of the battery etc., and the control unit changes the number of rotations according to a type of detected error. Also, a photodetector of the laser survey instrument of the present invention comprises a photodetection unit for receiving a laser beam from a rotary laser device and for emitting a photodetection signal, display means having a display corresponding to the photodetection signal, and judging means for detecting the number of rotations of the laser beam from the photodetection signal of the photodetection unit, and for operating the display means according to the rotating condition. Further, in the photodetector of the laser survey instrument of the present invention, the judging means is capable to detect the number of photodetection pulses per unit time. Also, in the photodetector of the laser survey instrument of the present invention, the judging means is capable to detect the cycle of the photodetection pulse.

Further, in the photodetector of the laser survey instrument of the present invention, the display means is an optical display unit and lights up a display, corresponding to the photodetection condition. Further, in the photodetector of the laser survey instrument of the present invention, the display means is a sound device and issues sound according to the photodetection status. Also, the laser survey instrument according to the present invention comprises a rotary laser device and a photodetector for receiving a laser beam, whereby the rotary laser device comprises a light source unit for emitting the laser beam, a rotator for projecting the laser beam toward the photodetector by rotary irradiation, detection means for detecting condition of the rotary laser device, and a control unit for changing the number of rotations of the rotator based on detection result from the detection means, and the photodetector comprises a photodetection unit for receiving the laser beam from the rotary laser device and for issuing a photodetection signal, display means having a display corresponding to the photodetection signal, and judging means for detecting the number of rotations of the laser beam from the photodetection signal of the photodetection unit and for operating the display means according to the rotating condition, and, when trouble occurs, the rotary laser device is capable to project the laser beam by rotary irradiation with the number of rotations corresponding to status of the trouble, and the photodetector identifies the number of rotations of the laser beam, provides a display corresponding to the number of rotations, and notifies the status of trouble of the rotary laser device.

DETAILED DESCRIPTION OF THE PREFERRED EMBODIMENT

In the following, description will be given on an embodiment of the present invention referring to the attached drawings.

According to the present invention, an information on the rotary laser device is transmitted to a photodetector using the number of rotations of the laser beam.

Figure 1:
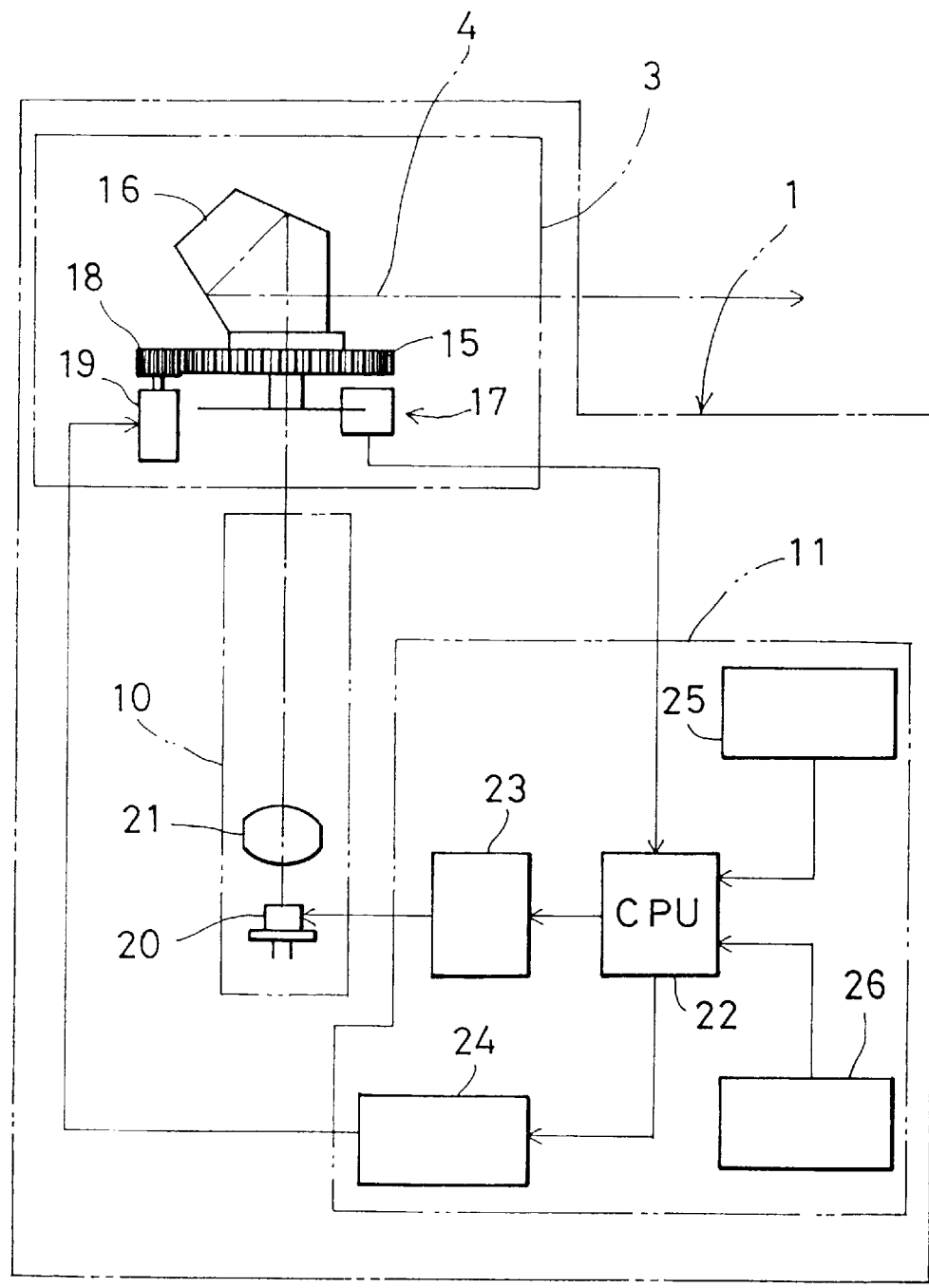
FIG. 1 is a block diagram showing a general arrangement of a rotary laser device in an embodiment of the present invention.
Figure 7:
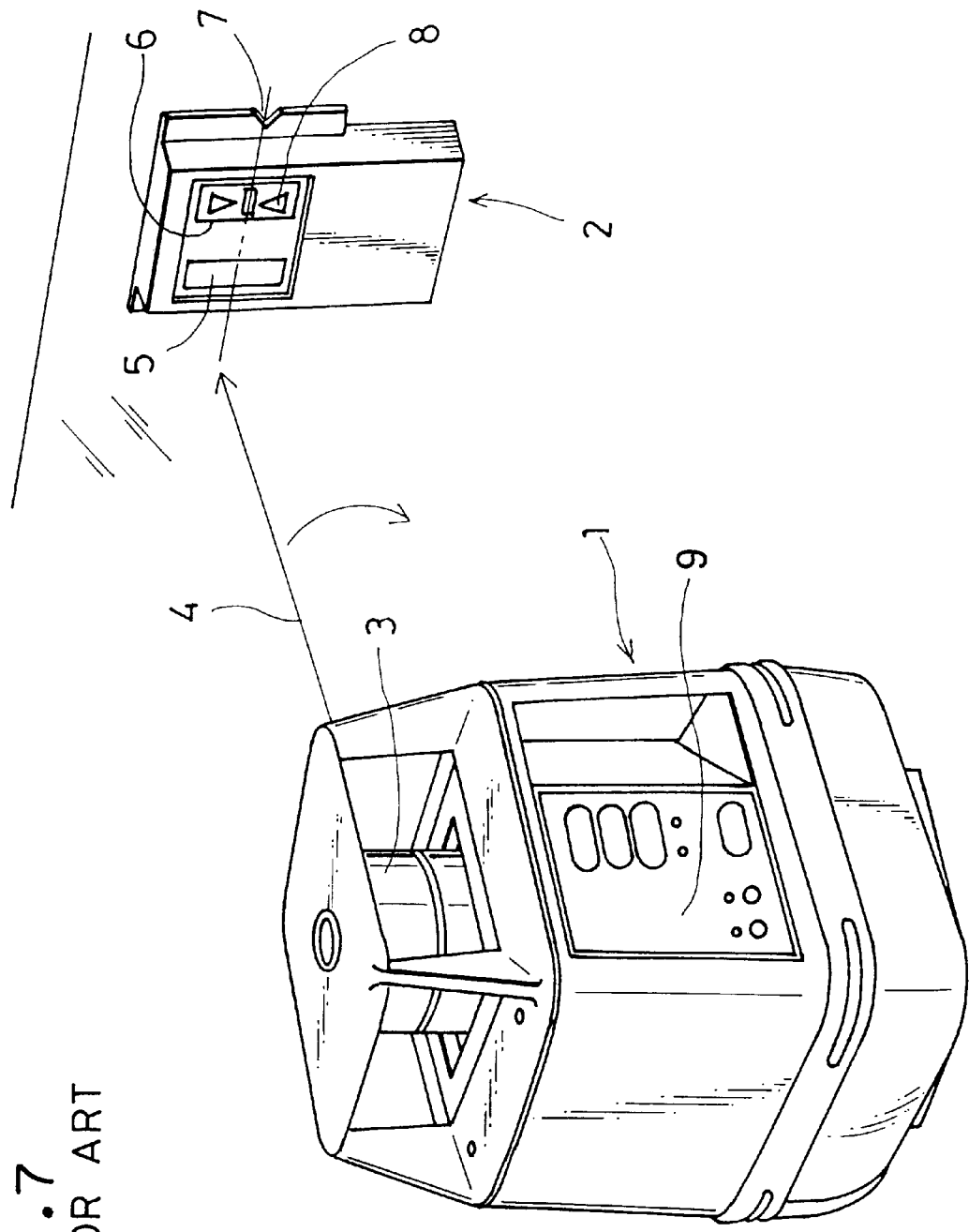
FIG. 7 is a perspective view showing a conventional type laser survey instrument.

In FIG. 1, the same component as in FIG. 7 is referred by the same symbol.

A rotary laser device 1 comprises a rotator 3, a light source unit 10 for emitting a laser beam 4, and a control unit 11 for driving and controlling the rotator 3 and the light source unit 10.

The rotator 3 comprises a pentagonal prism 16 integrally rotated with a driven gear 15, an encoder 17 arranged with respect to the driven gear 15, and a scanning motor 19 for rotating the driven gear 15 via a driving gear 18.

The light source unit 10 comprises a light source 20 such as a laser diode, and an optical projection system 21 consisting of a collimator lens, for turning the laser beam from the light source 20 to parallel beams, and of other components.

The control unit 11 comprises an arithmetic unit 22, a light emission driving unit 23, a motor driving unit 24, a battery remaining capacity monitor 25, and a tilt detector 26. The arithmetic unit 22 drives and controls the light source 20 via the light emission driving unit 23 and also drives the scanning motor 19 via the motor driving unit 24. A rotation signal is inputted to the arithmetic unit 22 from the encoder 17, and a signal relating to the remaining capacity of the battery is inputted from the battery remaining capacity monitor 25, and a signal relating to mounting status of the rotary laser device 1 such as tilting of the device is inputted from the tilt detector 26.

In the arithmetic unit 22, a program is set and inputted in advance so that the number of rotations of the scanning motor 19, i.e. the number of rotations of the pentagonal prism 16, is changed in case the remaining capacity of the battery is below a predetermined value or in case tilting of the rotary laser device 1 exceeds a predetermined value, i.e. in case the device falls down. For example, if it is supposed that the normal number of rotations is 600 rpm, the number of rotations of the pentagonal prism 16 is set to 250 rpm in case of battery error, i.e. in case the remaining capacity of the battery is below the predetermined value or in case the battery is not present, and the number of rotations of the pentagonal prism 16 is set to 200 rpm in case of falling-down error, i.e. in case the device falls down.

Figure 2:
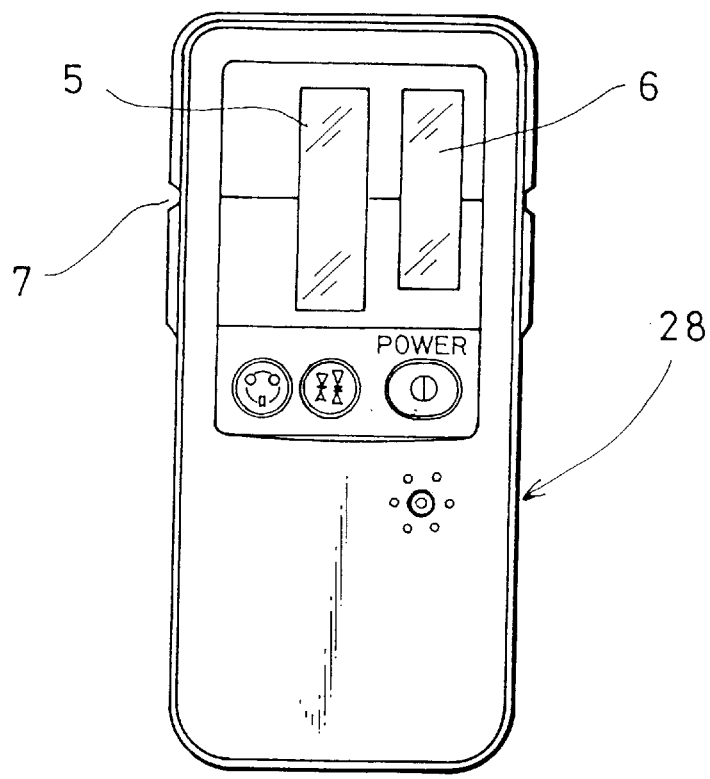
FIG. 2 is a front view of a photodetector in the embodiment of the present invention.
Figure 3:
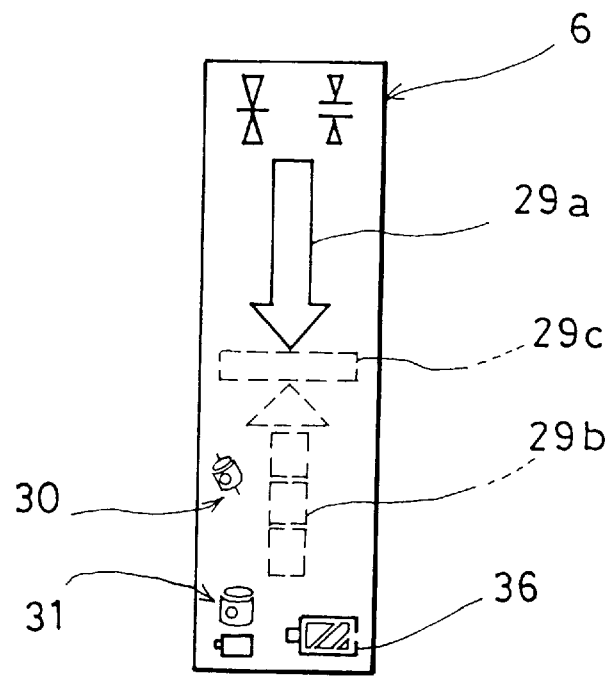
FIG. 3 is a front view of a display unit of the photodetector.

FIG. 2 shows an example of a photodetector 28. Like the photodetector 2 described above, the photodetector 28 comprises a photodetection unit 5, a display unit 6, and notches 7. As shown in FIG. 3, on the display unit 6, there are provided arrows 29a and 29b for displaying a moving direction of the photodetector 28 when photodetecting position of the photodetector 28 is not adequate, a bar 29c for displaying that the photodetecting position is adequate, a tilt indicator 30 for showing status of tilting of the rotary laser device 1, and a battery remaining capacity indicator 31 for indicating the remaining capacity of the battery of the rotary laser device 1. The remaining capacity of the battery of the photodetector 28 is indicated by a battery remaining capacity indicator 36.

Figure 4:
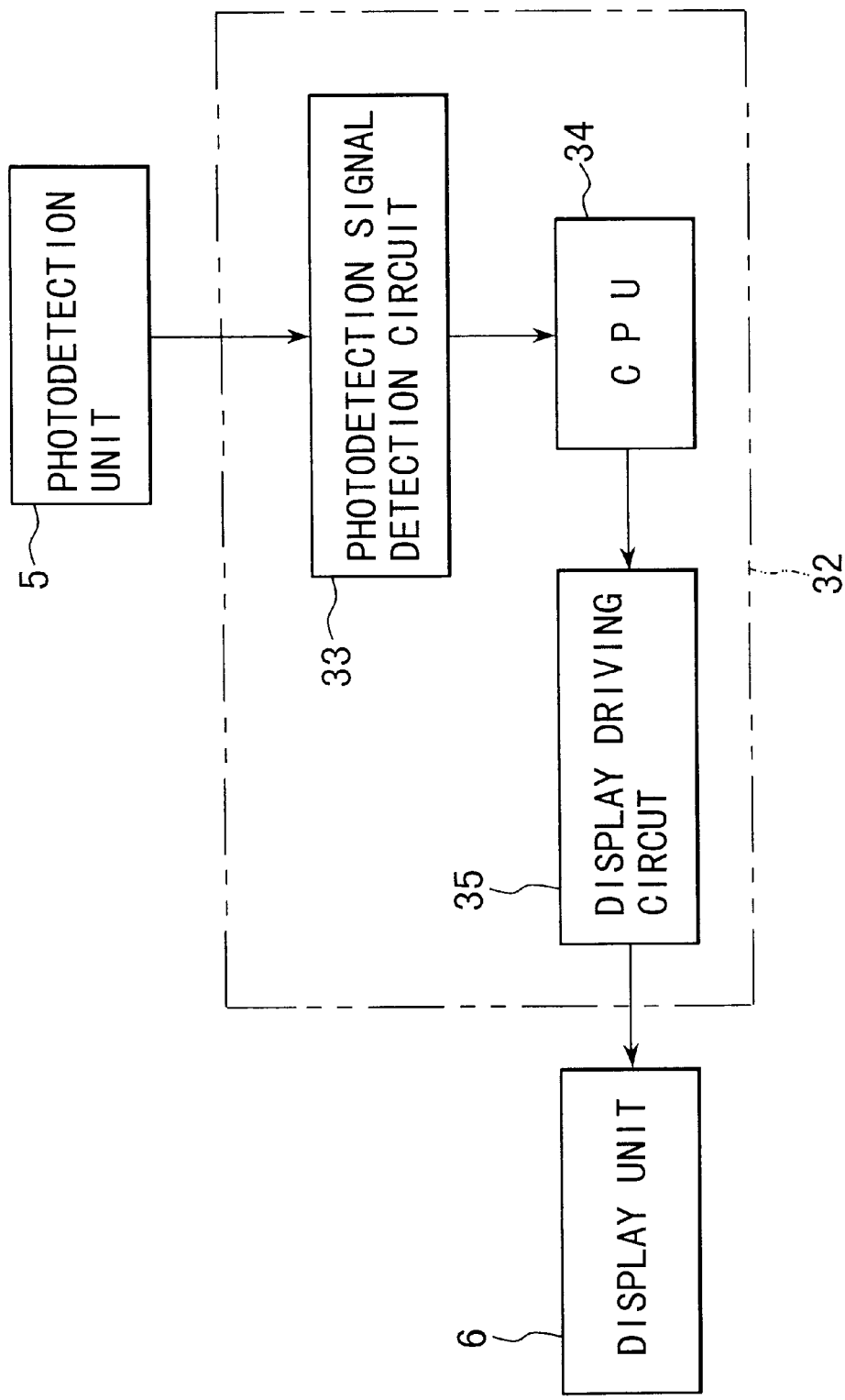
FIG. 4 is a block diagram of the photodetector.
Figure 5:
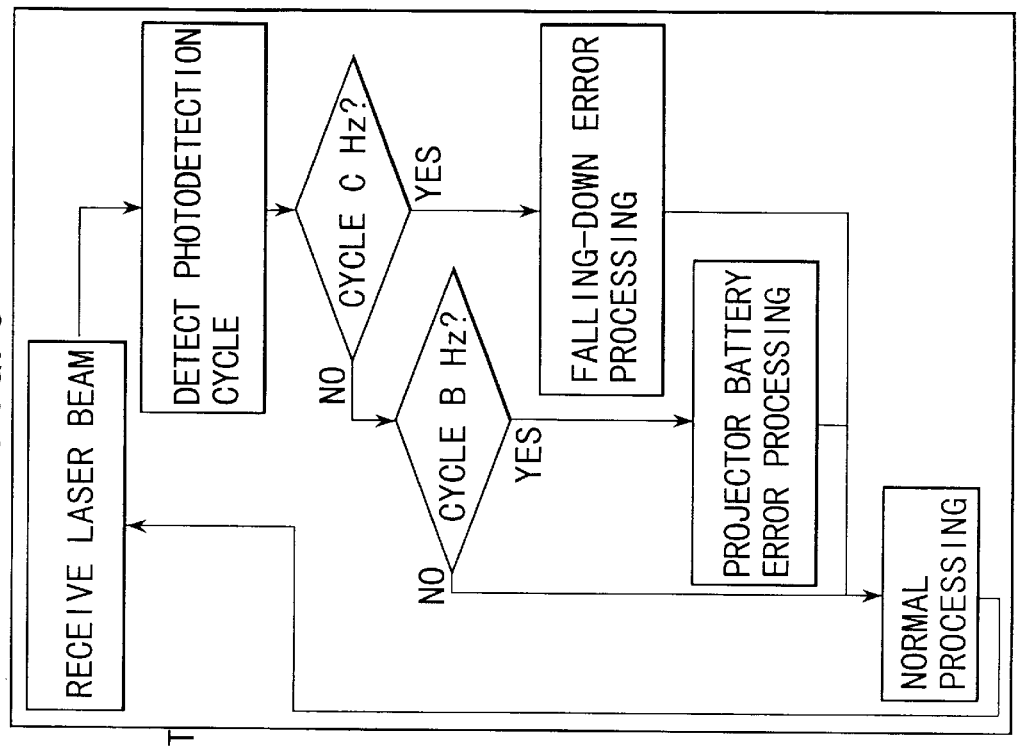
FIG. 5(A) and FIG. 5(B) each represents a flow chart of operation of the embodiment of the present invention.
Figure 5:
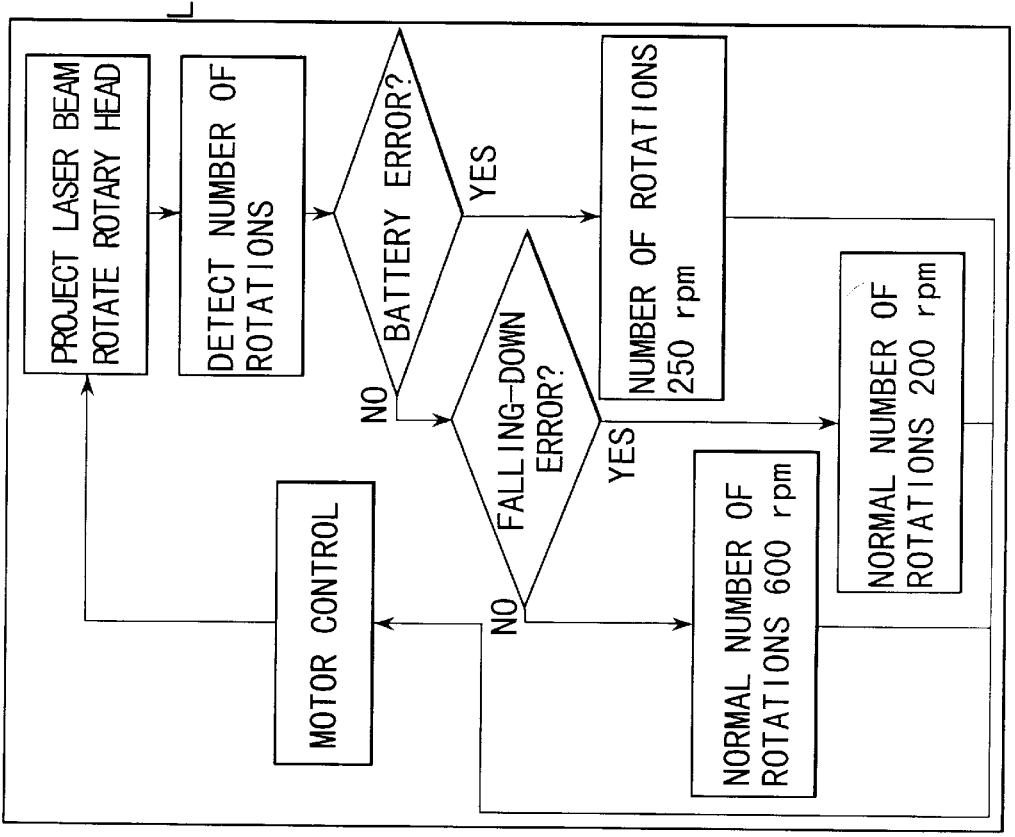

As shown in FIG. 4, the photodetector 28 has a photodetection status judging unit 32 in it, and the photodetection status judging unit 32 comprises a photodetection signal detection circuit 33, an arithmetic unit 34, and a display driving circuit 35. The photodetection status judging unit 32 drives the display unit 6 and controls display according to the photodetection signal from the photodetection unit 5.

Next, description will be given on operation of the present embodiment referring to FIGS. 5(A), 5(B), 6(A), 6(B), and 6(C).

The light source 20 is driven by the arithmetic unit 22 via the light emission driving unit 23. The laser beam emitted from the light source 20 is projected as parallel beams via the optical projection system 21. The light beam is deflected toward a horizontal direction by the pentagonal prism 16 and is projected. The arithmetic unit 22 drives the scanning motor 19 via the motor driving unit 24 and rotates the pentagonal prism 16 via the driving gear 18 and the driven gear 15. The laser beam 4 projected from the pentagonal prism 16 is rotated over total circumference and forms a horizontal reference plane.

In normal condition, the arithmetic unit 22 rotates the scanning motor 19 via the motor driving unit 24 and rotates the pentagonal prism 16 at 600 rpm. When the pentagonal prism 16 is rotated, the laser beam 4 is projected across the photodetection unit 5 of the photodetector 28 at a cycle corresponding to the number of rotations, and a pulse-like signal as shown in FIG. 6(A) is issued from the photodetector 5 to the photodetection signal detection circuit 33.

At the photodetection signal detection circuit 33, the cycle of the input signal is detected. It is checked whether the detected cycle is in normal status, in battery error status or in rotary laser device falling-down error status. If it is in normal status, the signal is inputted to the arithmetic unit 34. Via the display driving circuit 35, the arithmetic unit 34 notifies the display unit 6 to display that it is in normal status.

When the battery of the rotary laser device 1 is consumed and it is near expiration and a signal of battery expiration is issued from the battery remaining capacity monitor 25 to the arithmetic unit 22, the arithmetic unit 22 issues a signal to decrease the number of rotations to the motor driving unit 24, decreases rotating speed of the scanning motor 19 via the motor driving unit 24, and sets the number of rotations of the pentagonal prism 16 to an adequate value, e.g. 250 rpm, according to the detection of the number of rotations of the encoder 17. Further, when the tilt detector 26 detects that the rotary laser device 1 is extremely tilted due to falling-down or other cause and a falling-down error signal is inputted to the arithmetic unit 22, the arithmetic unit 22 decreases the number of rotations to a value different from that of the battery error status via the motor driving unit 24. For example, the arithmetic unit 22 controls the scanning motor 19 via the motor driving unit 24 and sets the number of rotations of the pentagonal prism 16 to an adequate value, e.g. 200 rpm, according to the detection of the number of rotations of the encoder 17.

Figure 6:
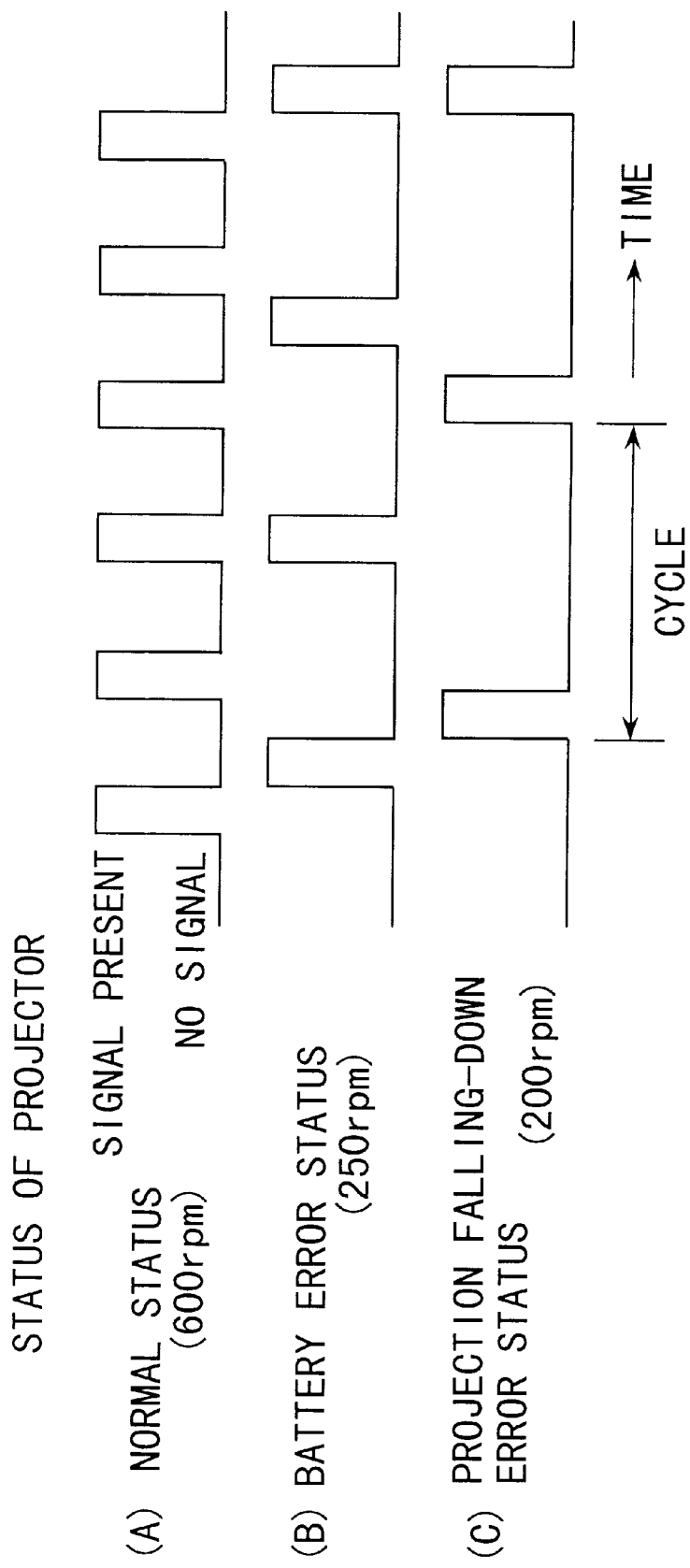
FIG. 6(A), FIG. 6(B) and FIG. 6(C) each represents a diagram of pulse signal of the laser beam received by the photodetector.

When the number of rotations of the pentagonal prism 16 is decreased, the cycle of the laser beam 4 passing through the photodetector 28 becomes longer as indicated in FIG. 6(B) or in FIG. 6(C). The photodetection signal detection circuit 33 detects the cycle of the signal from the photodetection unit, and it is checked whether the cycle has been changed due to battery error or to falling-down error, and the result of the checking is inputted to the arithmetic unit 34. Based on the result of the checking thus inputted, the arithmetic unit 34 lights up the display corresponding to the signal via the display driving circuit 35. Or, sound is issued from buzzer (not shown) at a predetermined pattern corresponding to the signal.

By looking at the display unit of the photodetector 28, it is possible for an operator to know that trouble has occurred on the rotary laser device 1, and further to know what type of trouble has occurred, e.g. whether it is a battery error or a falling-down error.

When the battery is replaced and the photodetector 28 is placed at a correct position, the signal from the battery remaining capacity monitor 25 and the tilt detector 26 are no more inputted to the arithmetic unit 22. Thus, the arithmetic unit 22 controls the motor driving unit 24 and rotates the pentagonal prism 16 in normal status. When the cycle of the laser beam received by the photodetection unit 5 of the photodetector 28 is turned to normal status, the signal from the photodetection signal detection circuit 33 is turned to normal status, and the display of the display unit 6 is also restored to normal condition.

The sound issuing means as represented by the buzzer as described above may have different sound interval according to the photodetecting condition or may have different sound tone. It is also possible to simultaneously use optical display means and sound display means.

As described above, the laser survey instrument according to the present invention transmits an information of trouble on the rotary laser device to the photodetector by changing the number of rotations of the laser beam projection. Therefore, it is possible to attain superb effect to transmit information in easy and simple manner without requiring much power consumption.

What is claimed is:

1. A laser survey instrument, comprising a light source unit for emitting a laser beam, a rotator for projecting said laser beam toward a photodetector by rotary irradiation, detection means for detecting information about the status of a main body, and a control unit for changing the number of rotations of said rotator corresponding to said information about the status of said main body detected by said detection means, wherein said information about said status of said main body is transmitted to said photodetector by changing said number of rotations.

2. A laser survey instrument according to claim 1, wherein said detection means detects tilting of said main body, and said control unit changes the number of rotations of said rotator when tilting of said main body exceeds a predetermined value.

3. A laser survey instrument according to claim 1, wherein said instrument further comprises a battery, and wherein said detection means detects the remaining capacity of said battery, and said control unit changes the number of rotations of said rotator when the remaining capacity of said battery is below a predetermined value.

4. A laser survey instrument according to claim 1, wherein said detection means detects a plurality of different status errors of said main body and said control unit changes the number of rotations according to the type of detected error.

5. A photodetector of a rotary laser device, comprising a photodetection unit for emitting a pulse signal by receiving a laser beam from said rotary laser device, display means having displays corresponding to the status of trouble on a main body, and judging means for judging the type of trouble on said main body based on a cycle of the pulsed signal and for controlling said display means so as to provide said displays corresponding to said type of trouble.

6. A photodetector of a rotary laser device according to claim 5, wherein said judging means is capable of detecting the number of photodetection pulses per unit time.

7. A photodetector of a rotary laser device according to claim 6, wherein said judging means is capable of detecting the cycle of the photodetection pulse.

8. A photodetector of a rotary laser device according to claim 5, wherein said display means is an optical display unit and lights up a display corresponding to the photodetecting condition.

9. A photodetector of a rotary laser device according to claim 5, wherein said display means is a sound device and issues sound according to the photodetection status.

10. A laser survey instrument, comprising a rotary laser device and a photodetector for receiving a laser beam from said rotary laser device, wherein said rotary laser device comprises a light source unit for emitting the laser beam, a rotator for projecting the laser beam by rotary irradiation and for forming a laser reference plane, detection means for detecting the type of trouble on a main body, and a control unit for changing the number of rotations of said rotator corresponding to said type of trouble detected by said detection means, and said photodetector comprises a photodetection unit for issuing a pulsed signal by receiving the laser beam from the rotary laser device, display means having displays corresponding to the type of trouble on said main body, and judging means for judging the type of trouble on said main body from a cycle of said pulsed signal and for controlling said display means so as to provide a display according to the type of trouble, wherein the type of trouble on said main body is transmitted to the photodetector by the number of rotations of said laser beam.

11. A laser survey instrument, comprising a light source unit for emitting a laser beam, a rotator for projecting the laser beam by rotary irradiation and for forming a laser reference plane for indicating a reference point by a photodetector, detection means for detecting the type of trouble on a main body, and a control unit for changing the number of rotations of said rotator based on the result of the detection from said detection means and having a program for emitting a pulse signal toward the photodetection unit in advance corresponding to the type of trouble.

* * * * *